Sept. 8, 1970     R. S. THATCHER     3,527,363
APPARATUS FOR ROTATING STRUCTURAL SHAPES
Filed Aug. 26, 1968     4 Sheets-Sheet 1
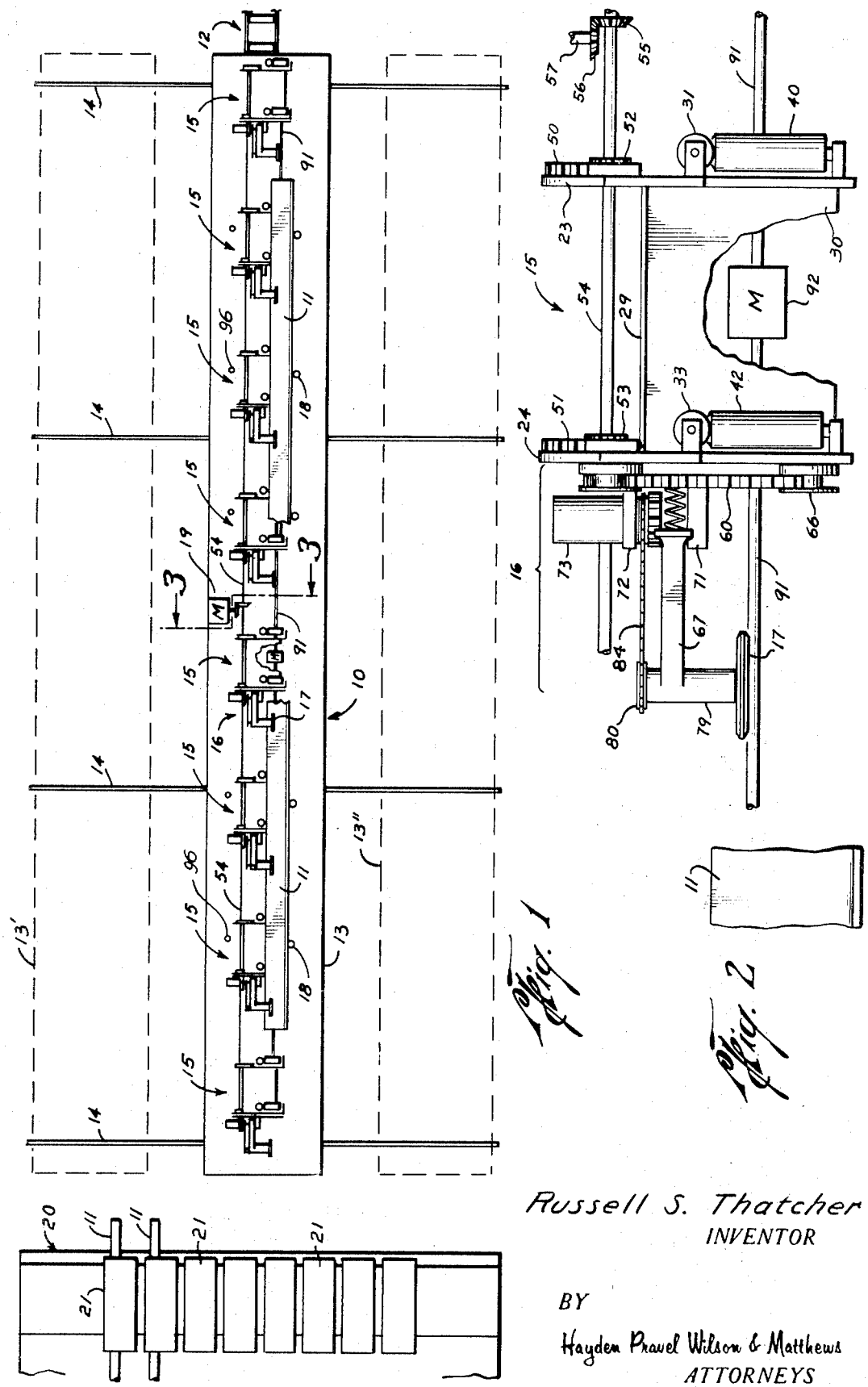
Russell S. Thatcher
INVENTOR
BY
Hayden Pravel Wilson & Matthews
ATTORNEYS Sept. 8, 1970 R. S. THATCHER 3,527,363
APPARATUS FOR ROTATING STRUCTURAL SHAPES
Filed Aug. 26, 1968 4 Sheets-Sheet 2

Russell S. Thatcher
INVENTOR

BY
Hayden Pravel Wilson & Matthews
ATTORNEYS

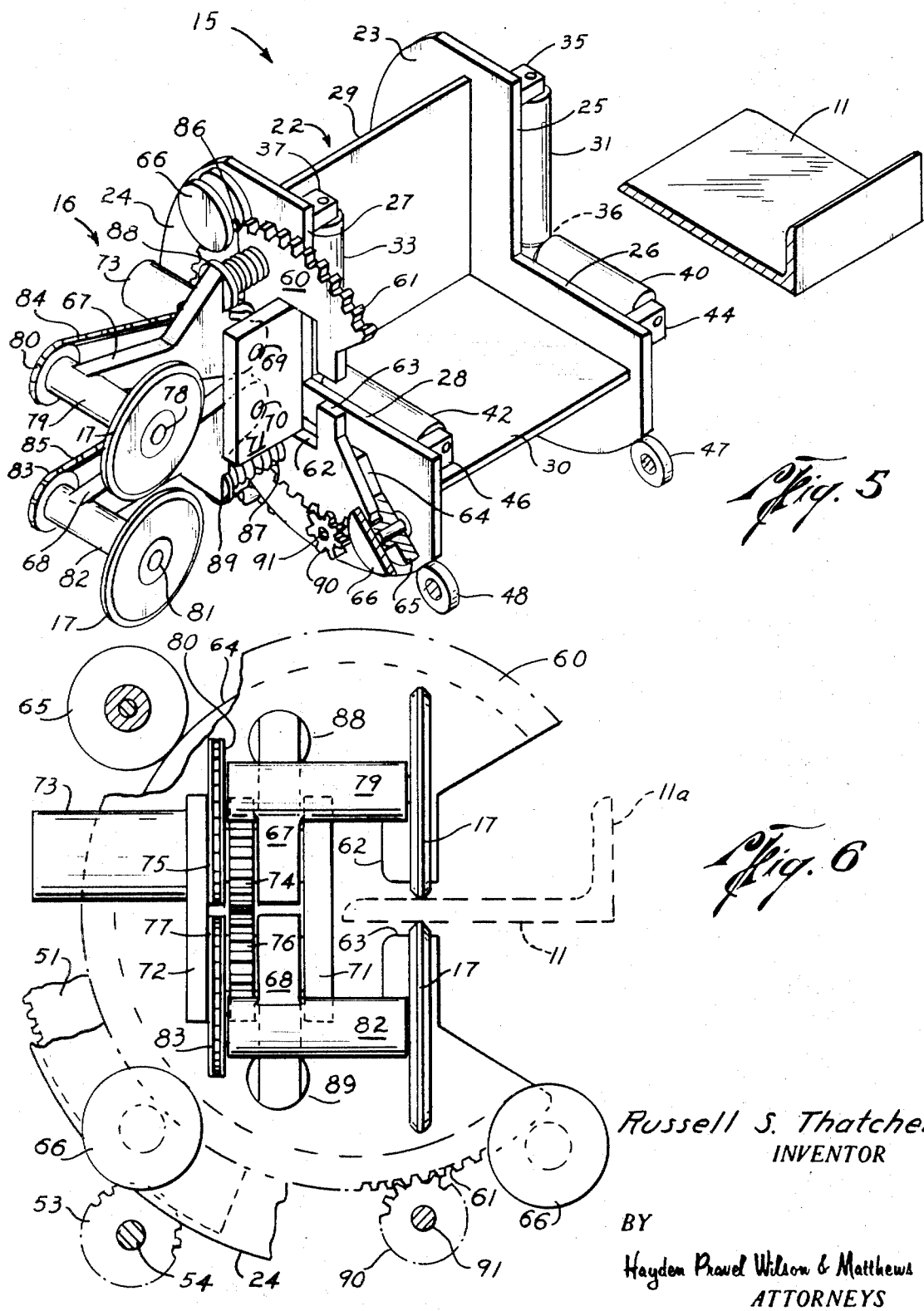

Russell S. Thatcher
INVENTOR

BY
Hayden Pravel Wilson & Matthews
ATTORNEYS

United States Patent Office 3,527,363
Patented Sept. 8, 1970

3,527,363
APPARATUS FOR ROTATING STRUCTURAL SHAPES
Russell S. Thatcher, Dallas, Tex., assignor to Kelso Marine, Inc., a corporation of Texas
Filed Aug. 26, 1968, Ser. No. 755,342
Int. Cl. B25j *3/00;* B65g *47/24*
U.S. Cl. 214—1                                    14 Claims

ABSTRACT OF THE DISCLOSURE

A series of guide roller assemblies are mounted on and positioned along an elongated support carriage for receiving and holding an elongated structural shape. Means are provided for rotating the guide roller assemblies and thereby rotating the structural shape about an axis parallel to a longitudinal dimension of the shape. Each guide roller assembly includes a driver subassembly adapted to engage the structural shape and to move it longitudinally along the path defined by the guide roller assemblies.

BACKGROUND OF THE INVENTION

This invention relates to apparatus for rotating elongated structural shapes.

Structural metal shapes, such as I-beams, T-beams, angles, channels and flat bars, can be used in the manufacture of various items which are manufactured in relatively large quantities. An example would be the manufacture of prefabricated reinforced structural panels. Such panels comprise a structural metal plate having a series of elongated structural metal shapes welded thereto for reinforcing same. In the manufacture of such panels, it is necessary that the shapes be placed on the plates with a particular angular orientation depending on the type of shape being used and the use to which the panel is to be put. Where many such panels are to be manufactured, it is desirable that this placement be performed in a rapid and efficient manner.

SUMMARY OF THE INVENTION

It is an object of the invention, therefore, to provide new and improved apparatus for rotating elongated structural shapes about an axis parallel to a longitudinal dimension thereof.

It is another object of the invention to provide new and improved apparatus for rotating elongated structural shapes which is capable of handling different types of structural shapes.

It is a further object of the invention to provide new and improved apparatus for handling structural shapes whereby the shapes may be removed from an incoming conveyor system, given a desired angular orientation about their longitudinal center axes and delivered to a plurality of receiving points some of which are not in line with the conveyor system.

In accordance with one feature of the invention, apparatus for rotating elongated structural shapes comprises elongated support means and a plurality of guide roller means rotatably mounted on and spaced apart along the support means in line with one another for receiving an elongated structural shape. The apparatus also includes driver means mounted on at least one of the guide roller means. Such driver means includes means for engaging the structural shape and moving it longitudinally along the path defined by the plurality of guide roller means. The apparatus further includes means for rotating the guide roller means for rotating the structural shape about an axis parallel to a longitudinal dimension of the shape.

In accordance with another feature of the invention, the apparatus includes an elongated support carriage means located intermediate a conveyor system for supplying structural shapes and utilization means for receiving structural shapes. The guide roller means are rotatably mounted on the support carriage means and means are provided for enabling transverse movement of the support carriage means for enabling structural shapes to be supplied to different receiving points associated with the utilization means.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings:

FIG. 1 is an overall plan view of a representative embodiment of apparatus constructed in accordance with the present invention;

FIG. 2 is an enlarged view of a portion of the FIG. 1 apparatus showing in greater detail one of the rotator or guide roller assemblies thereof;

FIG. 5 is a perspective view of the rotator assembly of FIG. 2;

FIG. 6 is an enlarged downstream end view of part of the rotator assembly of FIG. 2;

DESCRIPTION OF THE PREFERRED EMBODIMENT

Figure 3:
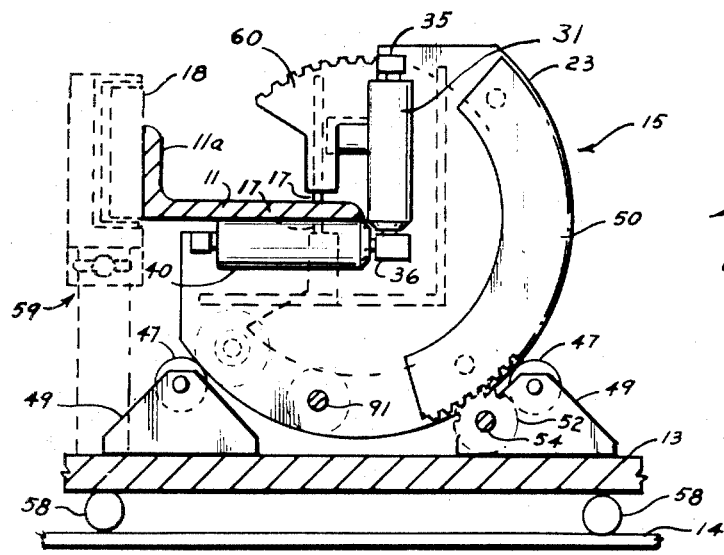
FIG. 3 is an enlarged cross-sectional view taken along section line 3—3 of FIG. 1 and showing an upstream end view of the rotator assembly of FIG. 2 in a first rotational position.

Referring to the overall plan view of FIG. 1, there is shown apparatus 10 for rotating elongated structural shapes, one of which is indicated at 11. The middle part of the shape 11 has been broken away to show some of the details of the apparatus 10 lying thereunder. For sake of an example, a structural shape of the angle beam type will be used in explaining the invention. It is to be understood, however, that other types of structural shapes, such as I-beams, T-beams, channels and flat bars, can be accommodated by the apparatus 10.

The structural shapes 11 are supplied one at a time to the apparatus 10 by means of a longitudinal conveyor system 12. Such conveyor system 12 moves each structural shape 11 in a longitudinal direction with respect to itself. The conveyor system 12 is a powered type of system which may be activated or deactivated to supply the shapes 11 as needed. The rotator apparatus 10 includes an elongated support means in the form of an elongated support carriage 13. Carriage 13 is movably mounted upon a set of carriage tracks 14. Means (not shown) are provided for moving the support carriage 13 in a lateral or transverse direction by moving it along the tracks 14. The maximum or extreme transverse positions of travel for the carriage 13 are indicated in outline form at 13' and 13".

The rotator apparatus 10 further includes a plurality of rotator or guide roller assemblies 15 rotatably mounted on and spaced apart along the support carriage 13. As seen, these guide roller assemblies 15 are in line with one another and are adapted to receive an elongated structural shape 11 from the conveyor system 12 when the carriage 13 is positioned so that the guide roller assemblies 15 are in line with the conveyor system 12. A driver subassembly 16 is mounted on each of the guide roller assemblies 15. Such subassembly 16 includes means indicated at 17 for engaging the structuaral shape 11 and moving it longitudinally along the path defined by the plurality of guide roller assemblies 15. A series of carriage-mounted guide rollers 18 are also provided for assisting in the guiding of the shape 11. The apparatus 10 also include means including a motor 19 for rotating the guide roller assemblies 15 for rotating the structural shape 11 about an axis parallel to a longitudinal dimension thereof. The structural shapes 11 are moved from right to left in the plan view of FIG. 1.

Located adjacent the downstream end of the rotator apparatus 10 is utilization apparatus 20 having a plurality of side-by-side receiving means 21 for receiving the rotated structural shapes in an end-wise manner. Two of the shapes 11 are shown as having already been inserted into the utilization apparatus 20. The utilization apparatus 20, only part of which is shown in FIG. 1, is of a type which is useful in manufacturing reinforced structural panels. As such, the purpose of the apparatus 20 is to hold a series of rotated structural shapes in a desired side-by-side manner. After it is loaded, the apparatus 20 is adapted to place the side-by-side shapes on top of a structural plate and then to assist in the transfer of both the shape and plate to a welding machine which serves to weld the shapes to the plate.

In use, the rotator apparatus 10 receives a first structural shape 11 from the conveyor system 12. The driver subassemblies 16 are operated at this time to assist in the receiving process. The guide roller assemblies 15 are then rotated to rotate the shape 11 about an axis parallel to a longitudinal dimension thereof to provide a desired angular orientation for the cross-section of the shape 11. The carriage 13 is then moved in a transverse direction to bring it into alignment with a desired one of the receiving means 21. The driver subassemblies 16 are then operated to transfer the rotated structural shape 11 to the selected receiving means 21. Depending on the extent of the transverse distance through which the carriage 13 is moved, part or all of the rotating step can be performed during the transverse movement of the carriage 13. After the first shape 11 has been transferred to the utilization apparatus 20, the carriage 13 is moved back to its starting position where it is in alignment with the conveyor system 12. The guide roller assemblies 15 are rotated back to their original positions (or to opposite facing rotational positions as will be discussed hereinafter) and the apparatus 10 is then ready to accept the next structural shape to be supplied by the conveyor system 12.

Figure 4:
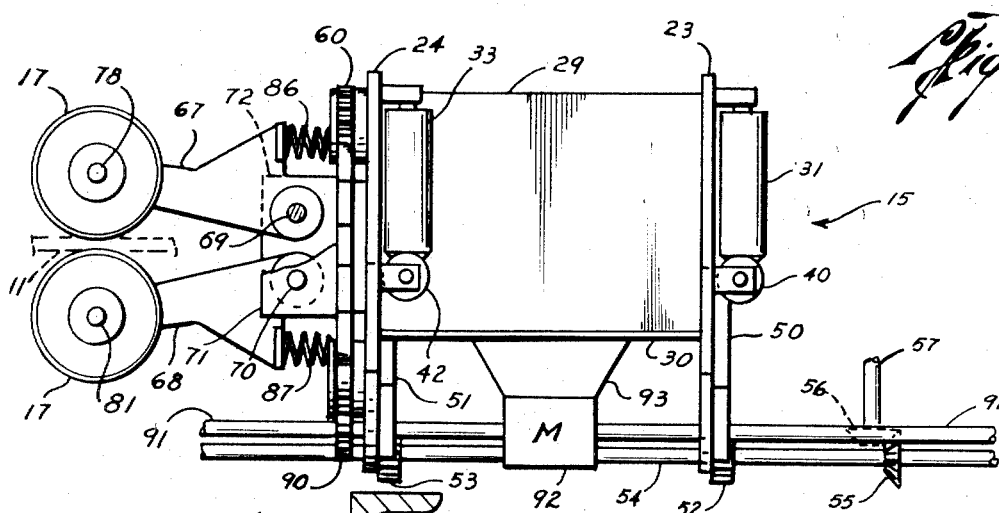
FIG. 4 is a side view of the rotator assembly of FIG. 2.

Referring now to FIGS. 2-6, there is shown in greater detail the manner of construction of one of the guide roller assemblies 15. These views show the assembly 15 in a first rotational position, namely, the position for receiving structural shapes from the conveyor system 12. FIG. 2 shows a plan view of the assembly 15. FIG. 3 shows an end view looking downstream. FIG. 4 shows a side view. FIG. 5 shows a perspective view and FIG. 6 shows an end view looking upstream.

As perhaps best seen in FIG. 5, the guide roller assembly 15 includes a body assembly 22 having a pair of aligned partially-circular end plates 23 and 24. The upstream end plate 23 has two orthogonal interior edges 25 and 26 which define an open quarter sector of the end plate 23. The downstream end plate 24 includes two orthogonal interior edges 27 and 28 which define an open quarter sector of the end plate 24. The end plates 23 and 24 are fastened together by means of tie plates 29 and 30. A first set of guide rollers 31 and 33 are mounted on the end plates 23 and 24, respectively, parallel to and in cooperative alignment with the parallel set of orthogonal edges 25 and 27. The guide roller 31 is rotatably mounted between a pair of support brackets 35 and 36 (the latter being shown in FIG. 3) such that the roller surface extends a short distance above the interior edge 25 of the end plate 23. The guide roller 33 is similarly rotatably mounted between an upper support bracket 37 and a lower support bracket (which is not visible), these brackets being fastened to the end plate 24.

A second set of guide rollers 40 and 42 are rotatably mounted on the end plates 23 and 24, respectively, parallel to and in cooperative alignment with the second set of orthogonal edges 26 and 28. The guide roller 40 is rotatably mounted between a bracket 44 and the bracket 36 previously mentioned, while the guide roller 42 is rotatably mounted between a bracket 46 and a second bracket which is not visible.

The various brackets 35, 44 and 46 are fastened to their respective end plates 23 and 24. The first set of guide rollers 31 and 33 are mounted so that their roller surfaces extend a short distance above ("to the right of" in FIG. 5) the end plate edges 25 and 27. Similarly, the second set of guide rollers 40 and 42 are positioned such that their roller surfaces extend a short distance above the end plate interior edges 26 and 28.

The body assembly 22 is mounted on the carriage 13 by means of two sets of support rollers 47 and 48 which engage the circular edges of the end plates 23 and 24, respectively. As indicated in FIG. 3, the support rollers 47 are rotatably mounted in brackets 49 which are fastened to the carriage 13. The other set of support rollers 48 are mounted in a similar manner. Rotation of the body assembly 22 is produced by means of a pair of sector gears 50 and 51 (FIG. 2) which are fastened to the end plates 23 and 24, respectively. Sector gears 50 and 51 engage drive gears 52 and 53, respectively, which are mounted on a common drive shaft 54. Drive shaft 54 is, in turn, coupled to the rotator motor 19 (FIG. 1) by way of a pair of bevel gears 55 and 56 and a motor drive shaft 57. As indicated in FIG. 1, the rotator drive shaft 54 extends the entire length of the carriage 13 and is used for producing simultaneous rotation of each of the roller guide assemblies 15.

As indicated in FIG. 3, the carriage 13 is supported on the tracks 14 by means of suitable carriage wheels 58. Also, suitable support assemblies are provided for the carriage-mounted guide rollers 18, these support assemblies being fastened to the carriage 13 as indicated for the case of support assembly 59 shown in FIG. 3. These carriage-mounted guide rollers 18 are of the spring-loaded type and the support assemblies 59 are provided with means for adjusting their positions transversely of the carriage 13 for accommodating different sizes of structural shapes.

Referring particularly to FIGS. 5 and 6, the driver subassembly 16 which is mounted on the guide roller assembly 15 will now be described. This driver subassembly 16 includes a support plate 60 rotatably mounted on and parallel to the body assembly end plate 24. The support plate 60 is of approximately a partially-circular shape and is provided with gear teeth 61 around the circular portion of the periphery thereof. The support plate 60 is provided with an elongated slot 62 cut through an interior portion thereof. A second slot 63 running at right angles to the elongated slot 62 provides an opening through which the web portion of a structural shape may pass. The elongated slot 62, on the other hand, provides an opening for enabling the passage of a flange portion of a structural shape for the case where the flange or short leg of the shape rides against the guide rollers 31 and 33. This would, of necessity, be the case where a channel beam type of structural shape is being handled A set of carriage-mounted guide rollers 96 (FIG. 1) corresponding to guide rollers 18 are mounted on the right-hand side of the carriage 13 looking downstream) for purposes of assisting in guiding the shape 95 through the apparatus 10 when the guide roller assemblies 15 are in the FIG. 8 position.

The various motors associated with the rotator apparatus 10, namely, the main rotator motor 19, the drive roller motor 73, the driver subassembly positioning motor 92 and the motor for causing transverse movement of the carriage 13 (not shown) may be of either the electric or hydraulic type. The various on-off switches for these motors may be mounted on a master control panel (not shown) which is located to one side of the shapes rotator apparatus 10.

The operation of the rotator apparatus 10 involves the turning on and off of various motors in the proper sequences and at the proper times. These switching and timing functions may be readily performed by a human operator who is present and who is observing the performance of the various steps in the process. In such case, he would be stationed at the master control panel upon which are located the various control switches for the various motors.

Even though the foregoing would provide quite satisfactory operation, a major advantage of the present apparatus is that it may be readily adapted for operation in a completely automatic manner. In particular, the various switching and timing functions just described may be readily performed by means of appropriate automatic control circuits and timing circuits, together with the use of appropriate position sensing devices (such as "feeler" switches) for signaling when shapes are present at different positions in the system. In this manner, when a shape reaches a particular position, a control signal would be generated which would cause the initiation of a particular step in the process. When the step is completed, a second control signal would be generated to activate the appropriate mechanism for commencing the next step in the process.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for rotating elongated structural shapes comprising:
    elongated support means;
    a plurality of guide roller means rotatably mounted on and spaced apart along the support means in line with one another for receiving an elongated structural shape;
    driver means mounted on at least one of the guide roller means and including means for engaging the structural shape and moving it longitudinally along the path defined by the plurality of guide roller means; and
    means for rotating the guide roller means for rotating the structural shape about an axis parallel to a longitudinal dimension of the shape.

2. Apparatus for rotating elongated structural shapes in accordance with claim 1 wherein the driver means includes a plurality of driver means individually mounted on different ones of the guide roller means and individually including means for engaging the structural shape for causing the longitudinal movement thereof.

3. Apparatus for rotating elongated structural shapes in accordance with claim 1 wherein the driver means is rotatably mounted on at least one of the guide roller means and the apparatus includes means for rotating the driver means relative to the guide roller means for enabling the guide roller means to receive structural shapes having different cross-sectional orientations.

4. Apparatus for rotating elongated structural shapes in accordance with claim 1 wherein the driver means includes a pair of drive rollers for engaging opposite sides of the structural shape and means for operating the drive rollers for causing the longitudinal movement of the structural shape.

5. Apparatus for rotating elongated structural shapes in accordance with claim 1 which includes a plurality of driver means individually rotatably mounted on different ones of the guide roller means and individually including a pair of drive rollers for engaging opposite sides of the structural shape and means for operating the drive rollers for moving the structural shape longitudinally along the path defined by the plurality of guide roller means and which further includes means for rotating the driver means relative to the guide roller means for enabling the guide roller means to receive structural shapes having different cross-sectional orientations.

6. Apparatus for processing elongated structural shapes comprising:
    conveyor means for moving structural shapes one after the other in a longitudinal manner;
    utilization means having a plurality of side-by-side receiving means for receiving structural shapes in an endwise manner;
    elongated support carriage means located intermediate the conveyor means and the utilization means and extending in a longitudinal manner therebetween;
    a plurality of guide roller means rotatably mounted on and spaced apart along the support carriage means in line with one another for receiving an elongated structural shape from the conveyor means;
    driver means mounted on at least one of the guide roller means and including means for engaging the structural shape and moving it longitudinally along the path defined by the plurality of guide roller means;
    means for rotating the guide roller means for rotating the structural shape about an axis parallel to a longitudinal dimension of the shape; and
    means for enabling transverse movement of the support carriage means for enabling structural shapes to be supplied to different ones of the side-by-side receiving means associated with the utilization means.

7. In apparatus for rotating elongated structural shapes, a rotator assembly comprising:
    a body assembly for supporting a structural shape;
    a support plate mounted on the body assembly;
    a pair of arm members;
    means for pivotally fastening one end of each of the arm members to the support plate with the arm members extending out from the same side of the support plate with the center lines of the arms lying in a common plane at right angles to the support plate, the pivot axes being parallel to the support plate;
    a pair of drive rollers individually rotatably mounted at the other end of different ones of the arm members, the axes of rotation of the rollers being parallel to the support plate, the location of the drive rollers being such that pivotal movement of the arm members toward one another causes the roller surfaces to engage one another;
    the support plate and the means for pivotally fastening the arm members thereto being positioned so that the drive rollers can engage opposite sides of a structural shape when supported by the body assembly with the axes of rotation of the rollers being at right angles to a longitudinal dimension of the structural shape;
    means for urging the arm members toward one another; and
    means for operating the drive rollers for causing rotation thereof.

because such a shape has flanges or short legs on both sides of the beam.

The support plate 60 is rotatably mounted on the body assembly end plate 24 by means of a roller plate 64 which is fastend to the interior side of the support plate 60 and which rides on a series of bearing rollers 65 which are rotatably mounted on the end plate 24. Retainer heads 66 are provided on the bearing rollers 65 for preventing sidewise movement of the support plate 60.

The driver subassembly 16 also includes a pair of arm members 67 and 68 (see also FIG. 4) which are pivotally mounted by means of a pair of pivot shafts 69 and 70 between a pair of bracket plates 71 and 72 (FIG. 6) which, in turn are fastened to the support plate 60. The pivot shaft 69 for the upper arm member is actually the drive shaft of a motor 73 which is fastened to the bracket plate 72 (FIG. 6). Also mounted on the pivot shaft 69 is a drive gear 74 and a chain sprocket 75. Mounted on the pivot shaft 70 for the lower arm member 68 is a drive gear 76, which meshes with the drive gear 74 and a chain sprocket 77.

The shape engaging means 17 is in the form of a pair of drive rollers which are individually rotatably mounted at the other ends of the two arm members 67 and 68. The upper drive roller 17 is mounted on a roller shaft 78 which passes through a bearing member 79 which is fastened to the upper arm member 67. A chain sprocket 80 is secured to the far end of the roller shaft 78. The lower drive roller 17 is mounted on a roller shaft 81 which is supported by a bearing member 82 which is fastened to the lower arm member 68. A chain sprocket 83 is fastened to the far end of the roller shaft 81. A continuous link type chain 84 runs between the two chain sprockets 75 and 80 associated with the upper arm member 67. A second continuous link type chain 85 runs between the two chain sprockets 77 and 83 associated with the lower arm member 68.

As seen in FIG. 4, the center axes of the arm member pivot shafts 69 and 70 and the drive roller shafts 78 and 81 run parallel to the support plate 60. As seen in FIG. 6, the center lines of the arms 67 and 68 lie in a common plane at right angles to the support plate 60. As a consequence of this construction, pivotal movement of the arm members 67 and 68 toward one another causes the roller surfaces of the drive rollers 17 to engage one another.

A pair of coil springs 86 and 87 are mounted between the support plate 60 and the corresponding one of a pair of shoe plates 88 and 89 which are fastened to extended portions of the arm members 67 and 68, respectively. These coil springs 86 and 87 operate to urge the arm members 67 and 68 to pivot toward one another and thus to bring the drive rollers 17 into engagement with one another.

The guide roller assembly 15 includes means for rotating the driver subassembly support plate 60 relative to the body assembly end plate 24 for enabling the drive rollers 17 to accommodate structural shapes having different cross-sectional orientations. This drive roller positioning means includes a drive gear 90 (FIG. 5) which meshes with the teeth 61 on the support plate 60. Drive gear 90 is mounted on a drive shaft 91. As indicated in FIG. 4, the drive shaft 91 is driven by a motor 92. The motor 92 is secured to the bottom of the tie plate 30 by means of a support bracket 93. As indicated in FIG. 1, the drive shaft 91 extends almost the entire length of the carriage 13. As such, it passes through drive gears corresponding to the drive gear 90 in each of the various guide roller assemblies 15. This enables simultaneous positioning of the drive rollers 17 of each of the guide roller assemblies 15. It is sufficient to use only a single motor for this drive shaft 91, this being the motor 92 associated with the guide roller assembly 15 shown immediately to the left of the cross-section line 3—3 of FIG. 1. It is noted that this motor 92 is mounted on the guide roller assembly 15 so that it may be rotated therewith when the assembly 15 is rotated.

Figure 7:
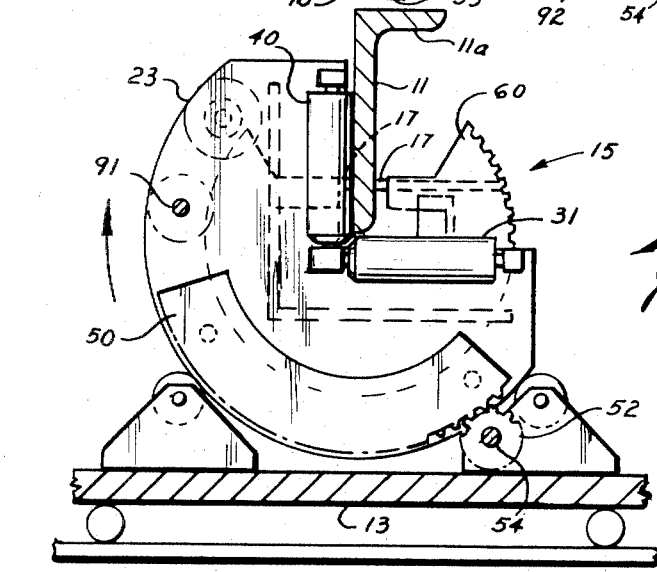
FIG. 7 corresponds to FIG. 3 but shows the rotator assembly in a second rotational position.

Considering now FIGS. 3 and 7 of the drawings, these are cross-sectional views of the shapes rotator apparatus 10 showing an end view of one of the guide roller assemblies 15 as seen when looking in a downstream direction. FIG. 3 represents a first rotational position for the guide roller assembly 15, while FIG. 7 shows a second rotational position for such guide roller assembly 15. Both figures are for the case where it is desired to have the short leg 11a of the structural shape 11 end up facing to the right after rotation.

FIG. 3 shows the rotational position of the guide roller assembly 15 when the structural shape 11 is being received from the conveyor system 12 (FIG. 1). The short leg 11a of the shape 11 is on the left. As the shape 11 leaves the conveyor system 12, it passes over the guide rollers 40 and 42 and is supported thereby. The drive rollers 17 are operative at this time for purposes of advancing the shape 11 into the rotator apparatus 10. After the shape 11 has completely entered the apparatus 10, the operation of the drive rollers 17 is discontinued. The main rotator motor 19 is then operated to simultaneously rotate each of the guide roller assemblies 15 through an angle of 90 degrees. With respect to FIG. 3, the operation of the rotator motor 19 causes rotation of the drive shaft 54 and the drive gear 52. This advances the sector gear 50 mounted on the rotator assembly 15.

FIG. 7 shows the position of the guide roller assembly 15 after the 90-degree rotation thereof. After such rotation, the operation of the rotator motor 19 is discontinued. The carriage 13 is then moved in a transverse direction (sidewise in FIG. 7) to the proper location. The drive rollers 17 are then operated (by means of the motor 73) so as to advance the structural shape 11 in its longitudinal direction and thereby to eject such shape 11 from the rotator apparatus 10.

Figure 8:
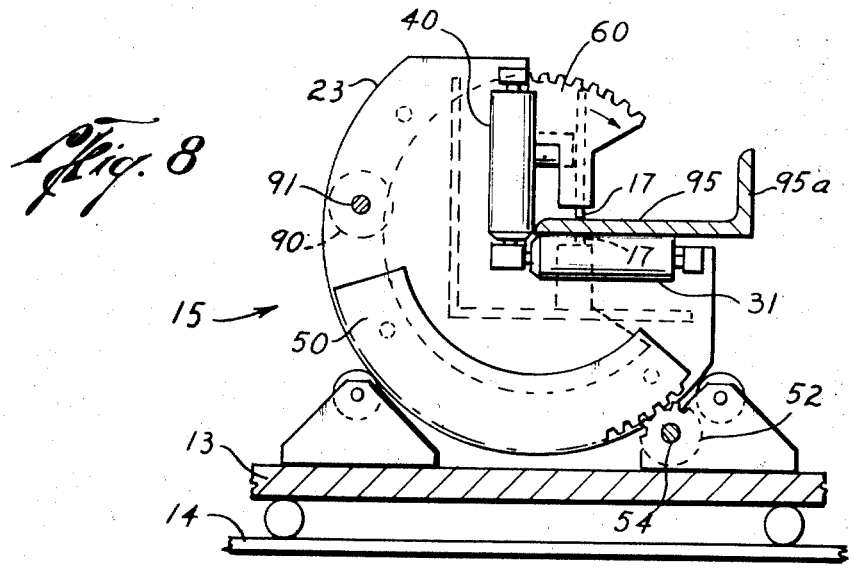
FIG. 8 is an enlarged cross-sectional view corresponding to FIG. 3 but showing the case where the apparatus is adjusted for receiving a structural shape having a short leg which is to be faced in an opposite direction from that of the short leg of the shape shown in FIG. 3.
Figure 9:
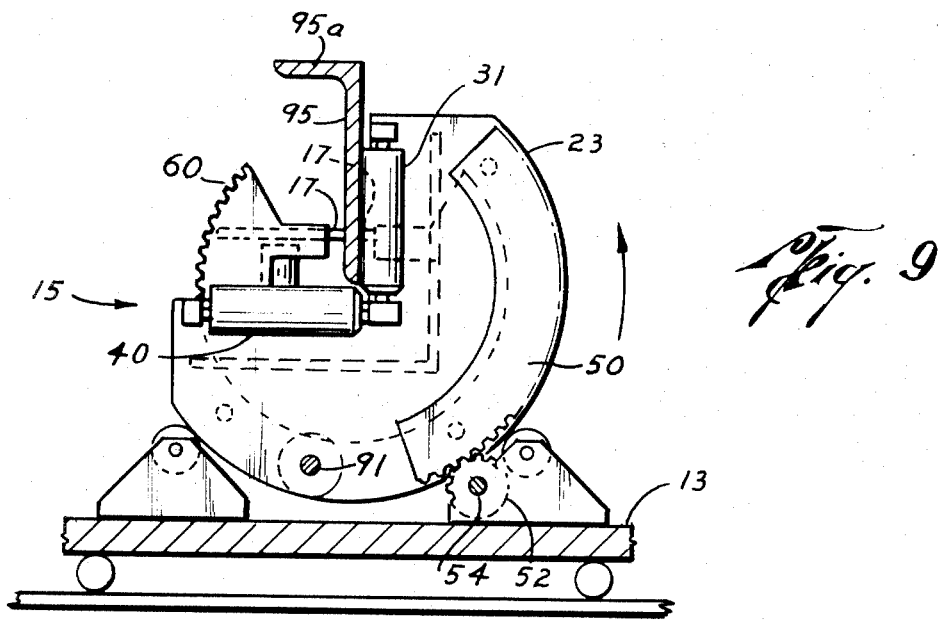
FIG. 9 corresponds to FIG. 8 but shows the rotator assembly in a second rotational position.

Referring now to FIGS. 8 and 9, there is represented the case where it is desired to rotate a structural shape 95 such that its short leg 95a will end up facing to the left, this being just the opposite of the case considered in connection with FIGS. 3 and 7. In this mode of operation, the structural shape 95 enters the guide roller assemblies 15 with the short leg 95a on the right as indicated in FIG. 8 (looking downstream). To make this possible, the initial position of the guide roller assembly 15 corresponds to the former 90-degree position. In other words, the guide roller assembly 15 is initially rotated so that the open quarter sector of the end plate 23 is initially on the right. It is then necessary to change the angular orientation of the drive rollers 17 relative to the end plate 23 so that they will be in the proper positions for engaging the top and bottom surfaces of the long leg of the shape 95. This change is accomplished by energizing the positioning motor 92 (FIG. 4) which rotates the drive shaft 91 which rotates the drive gear 90 which, in turn, causes rotation of the driver subassembly support plate 60. The direction of rotation of support plate 60 is as indicated by the small arrow in FIG. 8, namely, in a clockwise direction looking downstream. The location of the drive rollers 17 in FIGS. 7 and 8 should be compared to see how this changes the angular orientation thereof.

FIG. 8 shows the rotational position when a shape 95 is being received from the conveyor system 12. After the shape 95 has completely entered the rotator apparatus 10, the operation of the drive rollers 17 is discontinued, to bring the shape 95 to rest. The guide roller assemblies 15 are then rotated by an angle of 90 degrees, this time the rotation being in a counterclockwise direction looking downstream. This produces the situation depicted in FIG. 9. As there seen, the short leg 95a of shape 95 is facing to the left. The shape 95 is now in condition for removal from the rotator apparatus 10 and delivery to the next stage in the manufacturing operation.

8. A rotator assembly in accordance with claim 7 wherein the means for operating the drive rollers includes:
   motor means;
   means for fastening the motor means to the support plate; and
   means for operatively coupling the motor means to the drive rollers for causing rotation thereof when the motor means is energized.

9. A rotator assembly in accordance with claim 7 wherein the support plate is rotatably mounted on the body assembly and the rotator assembly includes means for rotating the support plate relative to the body assembly for enabling the drive rollers to accommodate structural shapes having different cross-sectional orientations.

10. A rotator assembly in accordance with claim 8 wherein the support plate is rotatably mounted on the body assembly and the rotator assembly includes means for rotating the support plate relative to the body assembly for enabling the drive rollers to accommodate structural shapes having different cross-sectional orientations.

11. In apparatus for rotating elongated structural shapes, a guide roller assembly comprising:
   a body assembly for supporting a structural shape and having a pair of aligned partially circular end plates each having two orthogonal interior edges which define an open quarter sector of the end plates, the two open sectors being in alignment with one another;
   a first set of guide rollers mounted on the body assembly parallel to and in cooperative alignment with one parallel set of the orthogonal edges;
   a second set of guide rollers mounted on the body assembly parallel to and in cooperative alignment with the other parallel set of the orthogonal edges;
   a support plate mounted on and parallel to one of the body assembly end plates;
   a pair of arm members;
   means for pivotally fastening one end of each of the arm members to the support plate with the arm members extending out from the same side of the support plate with the center lines of the arms lying in a common plane at right angles to the support plate, the pivot axes being parallel to the support plate;
   a pair of drive rollers individually rotatably mounted at the other end of different ones of the arm members, the axes of rotation of the drive rollers being parallel to the support plate, the location of the drive rollers being such that pivotal movement of the arm members toward one another causes the roller surfaces to engage one another;
   the support plate and the means for pivotally fastening the arm members thereto being positioned so that the point of engagement between the drive rollers is in alignment with the open sectors of the body assembly end plates for enabling the drive rollers to engage opposite sides of a structural shape when positioned on at least one set of the guide rollers;
   means for urging the arm members toward one another; and
   means for operating the drive rollers for causing rotation thereof.

12. A guide roller assembly in accordance with claim 11 wherein the means for operating the drive rollers includes:
   motor means;
   means for fastening the motor means to the support plate; and
   means for operatively coupling the motor means to the drive rollers for causing rotation thereof when the motor means is energized.

13. A guide roller assembly in accordance with claim 11 wherein the support plate is rotatably mounted on the body assembly end plate and the guide roller assembly includes means for rotating the support plate relative to the body assembly end plate on which it is mounted for enabling the drive rollers to accommodate structural shapes having different cross-sectional orientations.

14. A guide roller assembly in accordance with claim 12 wherein the support plate is rotatably mounted on the body assembly end plate and the guide roller assembly includes means for rotating the support plate relative to the body assembly end plate on which it is mounted for enabling the drive rollers to accommodate structural shapes having different cross-sectional orientations.

References Cited
UNITED STATES PATENTS 2,880,889  4/1959  Huffington.
3,236,396  2/1966  Goodberlet.

RICHARD F. AEGERTER, Primary Examiner

U.S. Cl. X.R.

198—33